No. 859,964. PATENTED JULY 16, 1907.
M. MOLITOR.
GRAIN GUARD.
APPLICATION FILED OCT. 22, 1906.
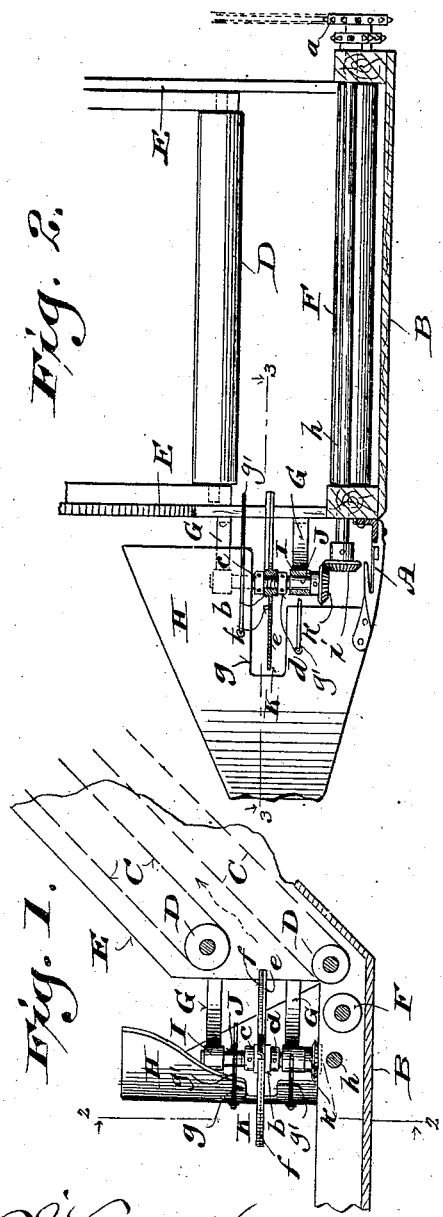
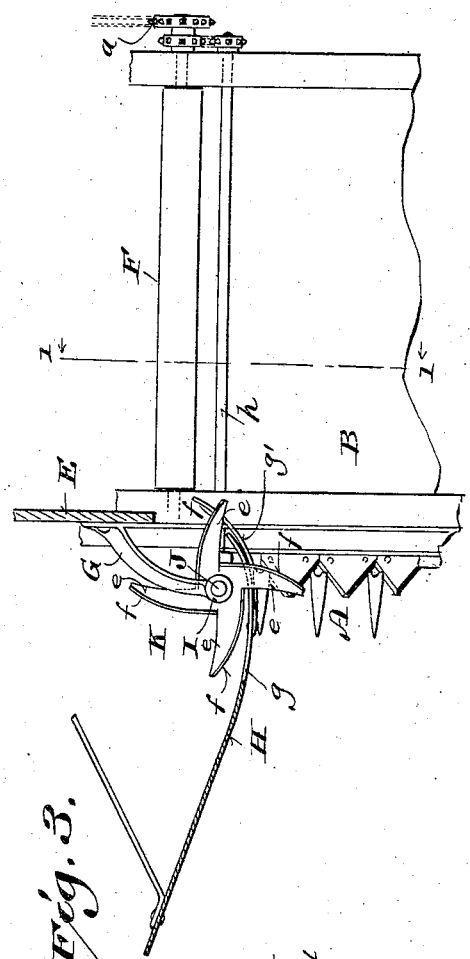
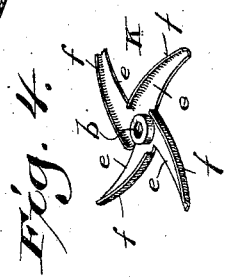

UNITED STATES PATENT OFFICE.

MICHAEL MOLITOR, OF CALVARY, WISCONSIN.

GRAIN-GUARD.

No. 859,964.      Specification of Letters Patent.      Patented July 16, 1907.

Application filed October 22, 1906. Serial No. 339,923.

*To all whom it may concern:*

Be it known that I, MICHAEL MOLITOR, a citizen of the United States, and a resident of Calvary, in the county of Fond du Lac and State of Wisconsin, have invented certain new and useful Improvements in Grain-Guards; and I do hereby declare that the following is a full, clear, and exact description thereof.

The object of my invention is to provide simple and effective means for preventing grain from lodging at the junction of the cutting-apparatus and elevator of grain-binders, said invention consisting in certain peculiarities of construction and combination of parts as hereinafter fully set forth with reference to the accompanying drawings and subsequently claimed.

In the drawings: Figure 1 represents a longitudinal sectional view of a portion of a grain-binder embodying the features of my invention, the section being indicated by line 1—1 of Fig. 3; Fig. 2, a section of the same on line 2—2 of Fig. 1; Fig. 3, a plan view thereof with parts in section, as indicated by line 3—3 of Fig. 2, and Fig. 4, a detail perspective view of a detached reel made in accordance with my invention.

Referring by letter to the drawings, A indicates the cutters, B the platform and C the elevator-aprons of an ordinary grain-binder, the said aprons being mounted on the usual rollers D, fixed in bearings between the elevator-frame boards E, the platform-apron roller F being driven in the usual manner by a sprocket-wheel *a*, as shown in Figs. 2 and 3 of the drawings. Brackets G are secured to the front board E of the elevator-frame, and terminate directly behind the inner divider H into hubs I, which forms bearings for a vertical shaft J, said shaft being threaded intermediate of its ends for the reception of a similarly threaded hub *b*, of a reel K, which reel is held against turning upon the shaft by set-nuts *c*, *d*, respectively above and below the hub. The reel is formed with longitudinal arms *e* having their faces *f*, which oppose the grain, and are slightly turned up so as to prevent breaking or cutting the same, said reel being revoluble in the direction of the travel of the cut grain upon the platform, the arms in their rotation pass through a slot *g* in the divider H, and collect grain at this point, from whence it is delivered between the elevator-aprons, there being spring-fingers *g'* above and below said slot to further protect the grain from entangling in the reel-shaft.

The reel is driven at a slightly greater speed than the platform-elevator roller from which it receives its drive through a shaft *h*, in chain-and-sprocket connection with said roller shaft at the rear of the machine, the shaft *h* being connected to the reel-shaft by bevel-gears *i*, *k*, as shown.

By the described arrangement, it will be seen that the reel is approximately over the last finger-bar of the cutting-apparatus, and will thus insure the grain lodged at the junction of the knives, elevator, and inner divider being caught and delivered, the said reel being readily and securely adjusted in position by its supporting-arms and lock-nuts.

I claim:

1. In a grain-binder, the combination of the cutting-apparatus, an elevator, a slotted divider, and a grain-guide reel revoluble on a vertical axis in front of the machine on the stubble side of said divider, said reel having arms rotatable through the divider slot.

2. In a grain-binder, the combination of the cutting-apparatus, an elevator, a slotted divider, and a grain-guide reel revoluble on a vertical axis in front of the machine on the stubble side of the divider, said reel being provided with arms having upturned faces rotatable through the divider slot.

3. A grain-guide reel for grain-binders comprising a vertical reel-shaft, a hub carried by said reel-shaft, reel-arms extending from the hub, having upturned faces, lock-nuts for said hub in threaded-engagement with the aforesaid reel-shaft, and a driving-gear for the reel-shaft.

4. In a grain-binder, the combination of a slotted divider, a grain guide-reel comprising a vertical reel-shaft supported in bearings at the front of the machine on the stubble side of the divider, radial arms projecting from the reel-shaft adapted to rotate through the divider slot, a bevel-gear secured to the lower end of said reel-shaft, a shaft carried by the binder platform, driving means for the shaft, and a bevel-gear secured to said shaft in mesh with the bevel-gear of the aforesaid reel-shaft.

In testimony that I claim the foregoing I have hereunto set my hand at Calumet in the county of Fond du Lac, and State of Wisconsin in the presence of two witnesses.

MICHAEL MOLITOR.

Witnesses:
    JOSEPH WINKEL,
    JOSEPH SCHILLER.